United States Patent [19]

Masaki et al.

[11] Patent Number: 4,947,267
[45] Date of Patent: Aug. 7, 1990

[54] IMAGE READING APPARATUS

[75] Inventors: Hisaji Masaki; Hideo Takaki, both of Yokohama, Japan

[73] Assignee: Canon Kabushiki Kaisha, Tokyo, Japan

[21] Appl. No.: 333,041

[22] Filed: Apr. 4, 1989

[30] Foreign Application Priority Data

Apr. 6, 1988 [JP] Japan .................................. 63-084259
Jun. 20, 1988 [JP] Japan .................................. 63-149997

[51] Int. Cl.⁵ .......................................... H04M 1/40
[52] U.S. Cl. ................................... 358/426; 358/461; 358/456; 358/464
[58] Field of Search ............... 358/282, 280, 138, 440, 358/461, 456, 457, 464, 426

[56] References Cited

U.S. PATENT DOCUMENTS 4,578,718 3/1986 Yamaguchi ......................... 358/282
4,698,688 10/1987 Ochi et al. ............................ 358/280

Primary Examiner—Edward L. Coles, Jr.
Attorney, Agent, or Firm—Fitzpatrick, Cella, Harper, Scinto

[57] ABSTRACT

An image reading apparatus has a CCD sensor for scanning an original image and outputting an analog image signal, an A/D converter for converting the analog image signal output from the CCD sensor into multi-value data consisting of a plurality of bits in units of pixels, and a selector for changing the number of bits of the multi-value data output from the A/D converter.

8 Claims, 12 Drawing Sheets

FIG. 10
| | (A7)X | (B7)0 | | | | | | | | | | (M7)7 |
|---|---|---|---|---|---|---|---|---|---|---|---|---|
| SEL70-SEL72 | X | 0 | 0 | 0 | 3 | 1 | 0 | 0 | 5 | 1 | 0 | 0 | 7 |
| SEL60-SEL62 | X | 0 | 0 | 0 | 2 | 1 | 0 | 0 | 4 | 1 | 0 | 0 | 6 |
| SEL50-SEL52 | 7 | 1 | 0 | 0 | X | 0 | 0 | 0 | 3 | 1 | 0 | 0 | 5 |
| SEL40-SEL42 | 6 | 1 | 0 | 0 | X | 0 | 0 | 0 | 2 | 1 | 0 | 0 | 4 |
| SEL30-SEL32 | 5 | 1 | 0 | 0 | 7 | 0 | 0 | 1 | X | 0 | 0 | 0 | 3 |
| SEL20-SEL22 | 4 | 1 | 0 | 0 | 6 | 0 | 0 | 1 | X | 0 | 0 | 0 | 2 |
| SEL10-SEL12 | 3 | 1 | 0 | 0 | 5 | 0 | 0 | 1 | 7 | 0 | 0 | 1 | X |
| SEL00-SEL02 | (A0)2 | (B0)1 | 0 | 0 | 4 | 0 | 1 | 1 | -6 | 0 | 0 | 1 | (M7)X |
| CYCLE # | 0 | 1 | 2 | 3 | 0 | 1 | 2 | 3 | 0 | 1 | 2 | 3 | 0 |
X = ARBITRARY VALUE
FIG. 11A
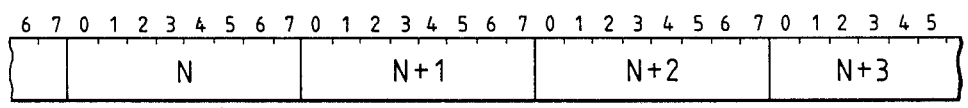
FIG. 11B
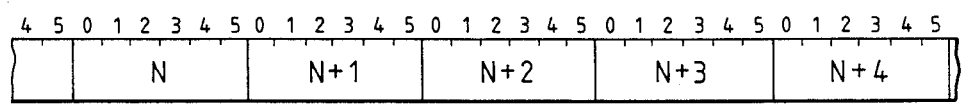

IMAGE READING APPARATUS

BACKGROUND OF THE INVENTION

1. Field of the Invention

The present invention relates to an image reading apparatus and, more particularly, to an image reading apparatus for converting an original density per pixel obtained by reading an original image into a digital value and outputting the digital value to an external device.

2. Related Background Art

In a conventional image reading apparatus, an original is illuminated, and illuminated image information is photoelectrically converted into a digital value (e.g., n bits/pixel), and the digital value is modulated into one of the following values:

(1) multi-value information (to be referred to as multi-values hereinafter) representing one pixel by n bits;

(2) binary information (to be referred to as a binary value hereinafter) representing one pixel as "1" or "0" information by using a predetermined digital value as a slice level; and (3) binary dither information (to be referred to as dither hereinafter) representing one pixel by "1" or "0" information by using each digital value of an m × n matrix as a slice level.

Another conventional image reading apparatus is known in which a data format of an image read by this apparatus is designated by an external device. For example, a binary mode, a dither mode, and a multi-value mode can be designated from the external device.

A bit width in the multi-value mode is defined by that of an internal A/D converter in the image reading apparatus independently of the bit width required for the external device. If 6-bit multi-value data is requested for an image reading apparatus having, e.g., an 8-bit A/D converter, this request cannot be accepted. In this case, the external device receives 8-bit data and then converts the 8-bit data into 6-bit data.

In the image reading apparatus having, e.g., an 8-bit A/D converter, information (8 bits/pixel) is transferred to the external device in the multi-value mode, and information (8 bits/8 pixels) is transferred to the external device in the binary and dither modes.

The conventional image reading apparatus reads an original and performs image modulation on the basis of a predetermined transfer format (8 bits/pixel in the multi-value mode; and 8 bits/8 pixels in the binary and dither modes).

The conventional data transfer scheme has three types of data, i.e., multi-values, a binary value, and dither, and three transfer formats, i.e., 8 bits/pixel in the multivalue mode, 8 bits/8 pixels in the binary mode, and 8 bits/8 pixels in the dither mode. Therefore, a circuit for converting an image to be transmitted to the external device into 8 bits/pixel and 8 bits/8 pixels, and a circuit for selecting one of the transfer formats are required.

In particular, in a reading apparatus for independently reading a character portion and a photographic portion of an original, a circuit for discriminating the character portion (binary information) from the photographic portion (dither information) is required. As a result, hardware of the reading apparatus becomes bulky, and a means for designating a transfer format and a data format (i.e., a control code supplied from the external device to the reading apparatus when the external device accesses the reading apparatus; and a control code for acknowledging a transfer format to the external device when the reading apparatus includes a means for designating image reading) is required.

SUMMARY OF THE INVENTION

The present invention has been made in consideration of the above situation, and has as its object to provide an image reading apparatus capable of transferring image data obtained by reading an original image to an external device in a plurality of different formats.

It is another object of the present invention to provide an image reading apparatus capable of transferring image data to an external device in a format requested by the external device.

It is still another object of the present invention to provide an image reading apparatus capable of simultaneously transferring image data of a plurality of formats to the external device.

The above and other objects, features, and advantages will be apparent from the following detailed description in conjunction with the accompanying drawings.

BRIEF DESCRIPTION OF THE DRAWINGS

FIG. 10 is a table showing outputs from a ROM;

FIGS. 11A and 11B show formats of outputs according to another embodiment of the present invention;

DETAILED DESCRIPTION OF THE PREFERRED EMBODIMENTS

Figure 1:
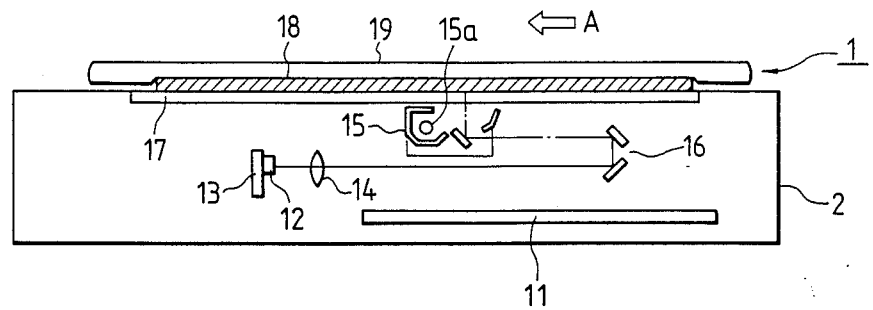
FIG. 1 is a view for explaining an internal arrangement of an image reading apparatus according to an embodiment of the present invention.

Preferred embodiments of the present invention will be described with reference to the accompanying drawings. FIG. 1 shows an internal arrangement of an image reading apparatus according to an embodiment of the present invention.

An original image reading apparatus (to be referred to as a reader hereinafter) 1 includes a reader housing 2. An original 18 placed with an original surface facing down on a platen glass 17 is illuminated by a halogen lamp 15a in an original illumination unit 15, and an original image is focused on a CCD (Charge-Coupled Device) 12 by a lens 14 through a reflecting mirror 16, thereby reading the original. The reader also includes a CCD driver 13 and a control unit 11 (to be described later). A platen cover 19 brings the original 18 into tight contact with the platen glass 17. The illumination unit 15 and the mirror 16 are reciprocated by a pulse motor (not shown).

Figure 3:
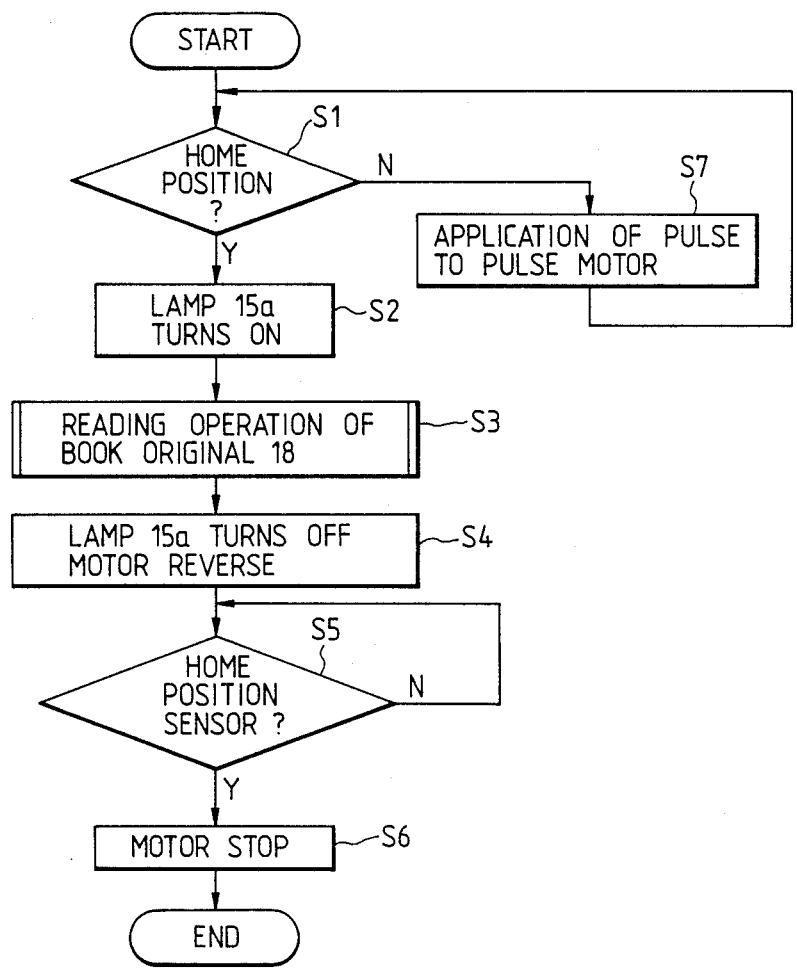
FIG. 3 is a flow chart showing read operations.
Figures 2, 2A:
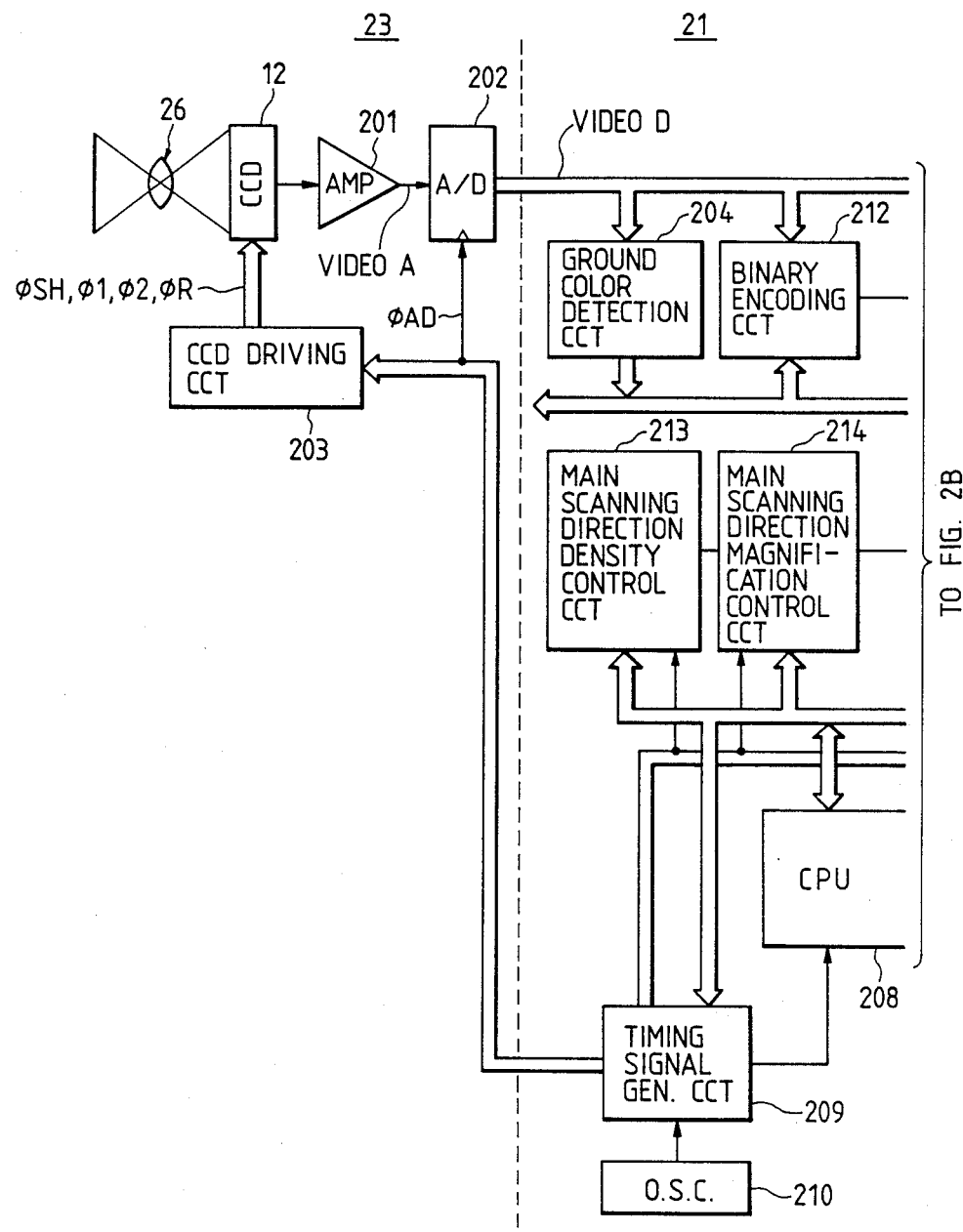
FIG. 2 composed of FIGS. 2A and 2B is a block diagram showing a main circuit arrangement of the apparatus shown in FIG. 1.
Figure 2B:
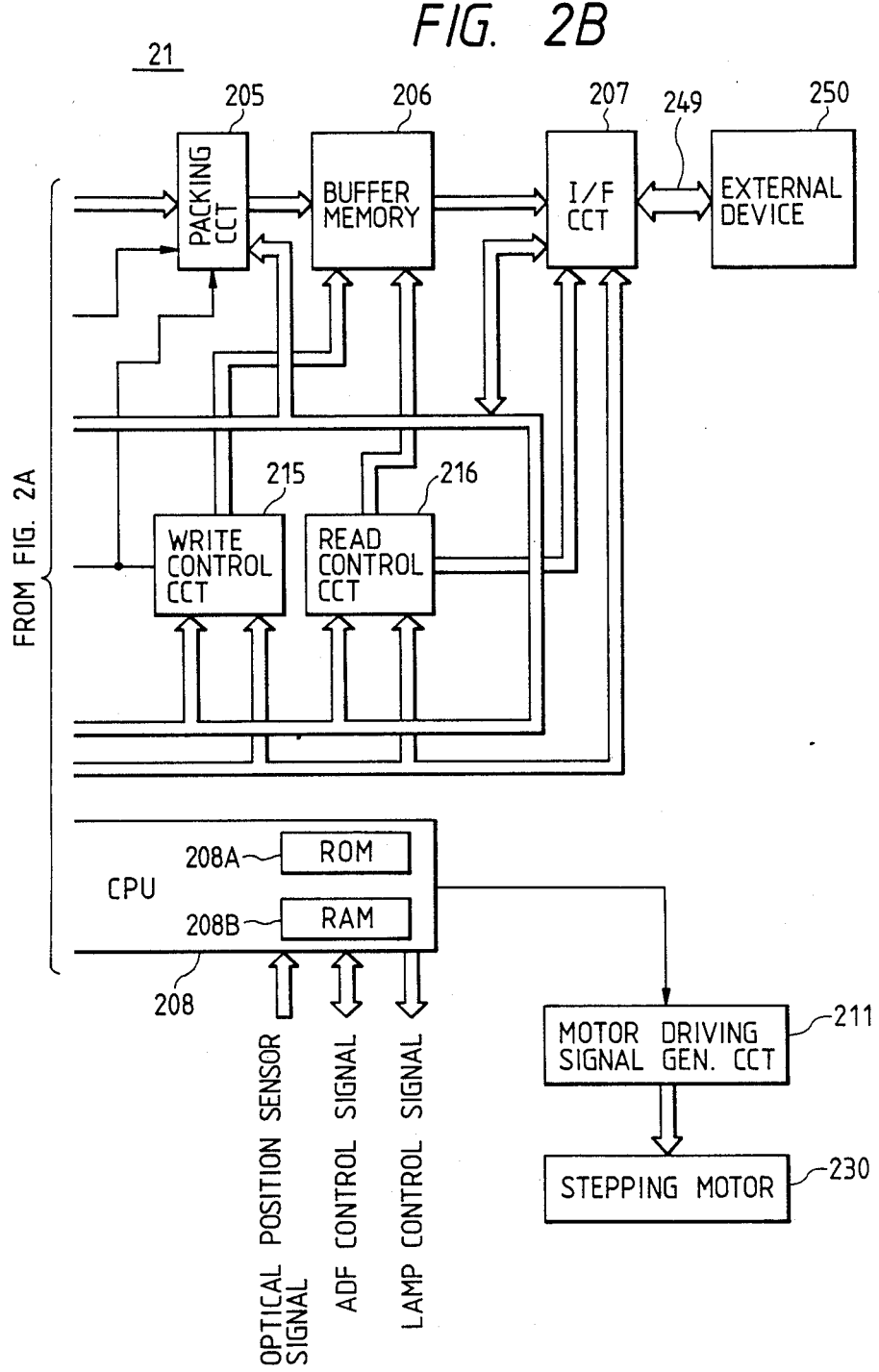

An operation of the reader 1 will be described with reference to FIGS. 1, 2, and 3. FIG. 2 composed of FIGS. 2A and 2B is a block diagram showing an internal circuit arrangement of the reader 1, and FIG. 3 is a sequence flow chart of reading operations.

The original 18 is placed on the platen glass 17 such that the leading end of the original is aligned with the right end of the platen glass 17. The home position of the original illumination unit 15 corresponds to the right end of the platen glass 17 in FIG. 1. The home position can be detected by a position sensor (not shown).

The reader 1 of this embodiment is connected to an external device 250 (e.g., a digital printer or a personal computer). Commands from these external devices and image data from the reader 1 are exchanged using a control signal line 249.

Prior to the operation of the reader 1, various commands are input from the external device 250 to the reader 1. For example, the input commands are a command for selecting a pixel density of 300, 150 or 75 ppi, and a command for setting an image data transfer format, i.e., the command for setting whether image data is transmitted in a binary or multi-value mode. Upon reception of these commands, a microprocessor (CPU) 208 performs necessary setting operations of a timing signal generation circuit 209 and a packing circuit 205.

Referring to FIG. 3, when a start command is input from the external device 250, the CPU 208 checks in step S1 whether the illumination unit 15 is located at the home position. If NO in step S1, the pulse motor is controlled to move the illumination unit 15 to the home position in step S7. The home position is defined as a position at which the illumination unit 15 is moved to the end opposite to a direction indicated by an arrow A in FIG. 1. The home position of the illumination unit 15 is detected by a sensor (not shown).

The lamp 15a is turned on (step S2), and the CPU 208 waits for 300 to 500 msec until the light amount is stabilized. The reader 1 then starts reading of an original. The reader 1 is driven to start scanning in the direction of the arrow A in FIG. 1. A distance from the home position of the original illumination unit 15 to the leading end of the original on the platen glass 17 is about 2 to 3 mm. During a period corresponding to this distance, a mirror scanning speed by the pulse motor is controlled to be stabilized.

When the original illumination unit 15 reaches the leading end of the original, the CPU 208 outputs an image signal enable signal to an I/F circuit 207, and the read image signals are sequentially output to the external device 250 (step S3).

The scanning position of the optical system is solely determined by the number of pulses for driving the pulse motor under the control of the CPU 208. When the CPU 208 outputs a necessary number of pulses to the pulse motor, it determines the end of original reading. The lamp 15a is turned off, an image output disable signal is output to the I/F circuit 207, and reverse rotation of the motor is performed, and at the same time the end of original reading is acknowledged to the external device 250 (step S4).

Thereafter, the CPU 208 detects that the original illumination unit 15 has returned to the home position (not shown) and stops rotating the motor (step S6). During backward movement of the optical system, when the next read command is not input from the external device 250, the original illumination unit 15 is kept stopped at the home position, and the series of operations are completed.

The internal arrangement of the image reading apparatus will be described with reference to FIG. 2. A CCD sensor 12 has several thousands of light-receiving elements. An amplifier 201 amplifies an analog signal from the CCD sensor 12. An A/D converter 202 converts the analog signal from the CCD sensor 12 into a digital signal. In this embodiment, the input analog signal is converted into a parallel signal (8 bits/pixel).

Figure 4:
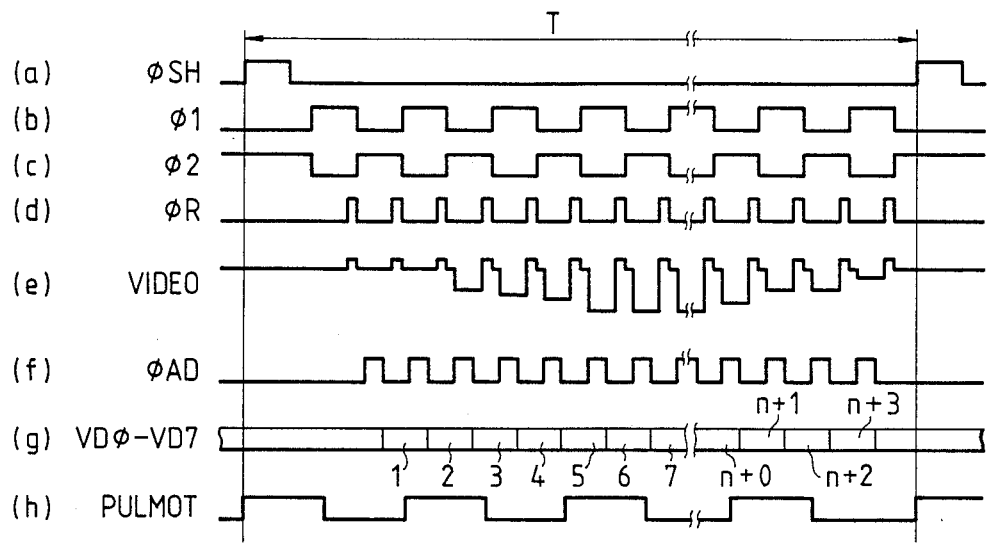
FIGS. 4 and 5A to 5D are timing charts of various signals associated with image reading in the arrangement of FIG. 2.

A timing signal generation circuit 209 supplies timing signals to a CCD driving circuit 203 and other circuits. FIG. 4 is a timing chart of signals supplied from the timing signal generation circuit 209 to the CCD sensor 12. An 8-bit output signal from the A/D converter 202 is represented as bits VD0 to VD7.

A main scanning direction density control circuit 213 and a main scanning direction magnification control circuit 214 serve to extract clocks from the timing signal generation circuit 209 in accordance with signals from the CPU 208.

A binary encoding circuit 212 encodes an image signal into a binary signal. More specifically, the binary encoding circuit 212 encodes the image signal into a dither signal by using a dither matrix or a binary signal by using a fixed value.

A serial-to-parallel converter serving as a packing circuit 205 converts the binary or multi-value image signal output from the binary encoding circuit 212 into an 8-bit parallel signal. The arrangement and operation of the packing circuit 205 will be described in detail later.

A buffer memory 206 temporarily stores the 8-bit parallel image signals and is used to match with the speed of the external device 250 which receives the image information from the reader 1. After these image signals are temporarily stored in the buffer memory 206, they are transmitted to the external device 250 through the I/F circuit 207. The control signal line 249 is used to send control signals from the external device 250 to the reader 1. Information transfer from the reader 1 to the external device 250 is also performed by using this control signal line. In addition, information transfer from the external device 250 to the reader 1 is also performed by using this control signal line. The control signal line 249 is a bidirectional signal line, and the direction of transmission is determined by a command from the external device 250.

Read and write control circuits 215 and 216 control read and write operations of the buffer memory 206.

The CPU 208 incorporates a ROM 208A and a RAM 208B and controls the sequence inside the reader.

A stepping motor 230 controls driving of the illumination unit 15 and the mirror 16 in the subscanning direction during original image reading. A motor driving signal generation circuit 211 drives the stepping motor 230. Drive clocks for the motor driving signal generation circuit 211 are generated by an internal timer in the CPU 208.

Figure 5A:
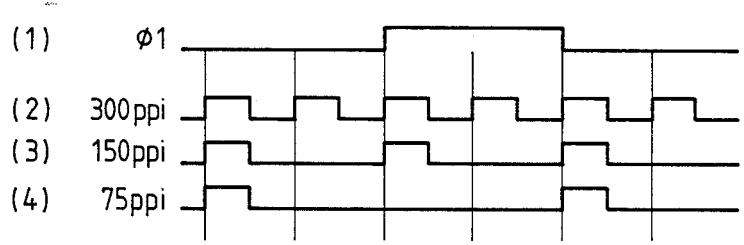

FIG. 5A shows an operation of the main scanning direction density control circuit 213. The main scanning direction density control circuit 213 comprises, e.g., a rate multiplier. Referring to FIG. 5A, a clock signal (2) is output from the control circuit 213 in the 300 ppi mode (pixel per inch), and the base clock input to the main scanning direction density control circuit 213 is directly output as the clock signal (2). Signals (3) and (4) are obtained by frequency-dividing the clock signal (2) into ½ and ¼, respectively. The signals (3) and (4) serve as clock signals in the 150 ppi and 75 ppi modes, respectively. Switching between these clock signals is controlled by the CPU 208.

Figure 5B:
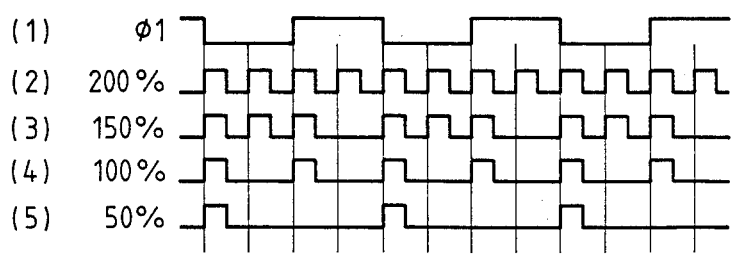

FIG. 5B shows an operation of the main scanning direction magnification control circuit 214. The control circuit 214 comprises, e.g., a rate multiplier including a base-10 counter. An input clock to the rate multiplier is supplied from the main scanning direction density control circuit 213.

FIG. 5B shows output clocks from the main scanning direction magnification control circuit 214 in the 300 ppi mode. Referring to FIG. 5B, (1) shows a state at 200% magnification; (2), 150% magnification; (4), 100% magnification; and (5), 50% magnification.

The output clock generated by the main scanning direction magnification control circuit 214 is supplied to the packing circuit 205 and the write control circuit 215. The packing circuit 205 is arranged to output packing data when it counts eight clocks in the binary mode. The above operations are performed under the control of the CPU 208.

The write control circuit 215 generates address information and write information on the basis of clocks supplied from the main scanning direction magnification control circuit 214. The address information and the write information are supplied to the buffer memory 206 and are output when eight clocks are counted in the binary mode in the same manner as in the packing circuit 205 under the control of the CPU 208.

The read control circuit 216 controls to transmit image information stored in the buffer memory 206 to the external device 250 through the I/F circuit 207. The mode of operation is set such that the address data and readout data are sequentially output to the buffer memory 206 and the image data are sequentially output thereto on the basis of a predetermined transfer speed.

Figure 5C:
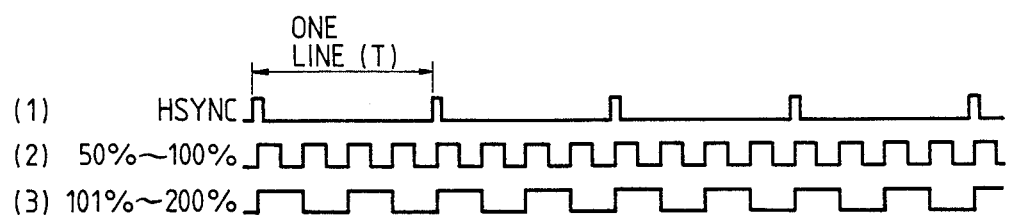

FIG. 5C shows the states of input clocks supplied from the CPU 208 to the motor driving signal generation circuit 211 to move the optical system (the illumination unit 15 and the mirror 16) in the subscanning direction. Referring to FIG. 5C, a signal HSYNC is a signal representing the period of one line. A clock (2) is used to read image data at a magnification of 50 to 100%. In this case, four pulses are used to drive one line. A clock (3) is used to read image data at a magnification of 101 to 200% and is obtained by frequency-dividing the clock (2) into ½.

These clocks are generated by an internal timer of the CPU 208.

Figure 5D:
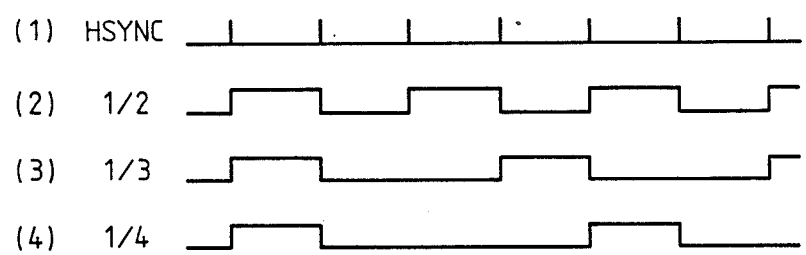

FIG. 5D is a case in which a write enable signal is controlled to write image data in the buffer memory 206 by interlacing the line information. The mode (2) shows ½ interlaced scanning; (3), ⅓ interlaced scanning; (4), ¼ interlaced scanning. Image density control and read magnification control in the subscanning direction are performed, as shown in FIGS. 5C and 5D. The subscanning operations are the same as main scanning operations, as disclosed in Ser. No. CFO-5475 US, DE, and a detailed description thereof will be omitted.

Figure 6:
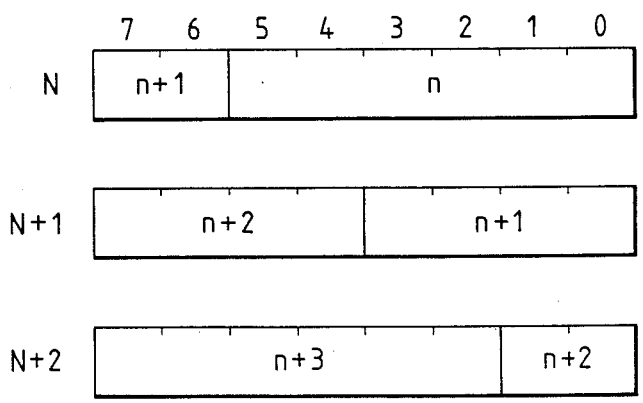
FIG. 6 is a diagram for explaining a packing operation.

The packing circuit 205 will be described in detail with reference to FIGS. 6 to 10. FIG. 6 shows a format in which 8-bit image data is converted into 6-bit data by the packing circuit 205, and the 6-bit data is transmitted onto the signal line 249 connected to the external device 250 having an 8-bit width.

FIG. 6 shows packing of n-pixel data into the Nth byte. More specifically, the upper six bits of the 8-bit data of the nth pixel are shifted to the lower six bits of the Nth byte, and lower two bits of the upper six bits of the 8-bit data of the (n+1)th pixel are added to the shifted bits, thereby transmitting 1-byte data. In this case, packing is performed toward the right. However, packing may be performed toward the left. The contents of a format ROM (to be described later) can be easily changed in this embodiment.

The (N+1)th and (N+2)th bytes are generated and sequentially transmitted to the external device 250 in a similar manner.

Figure 7:
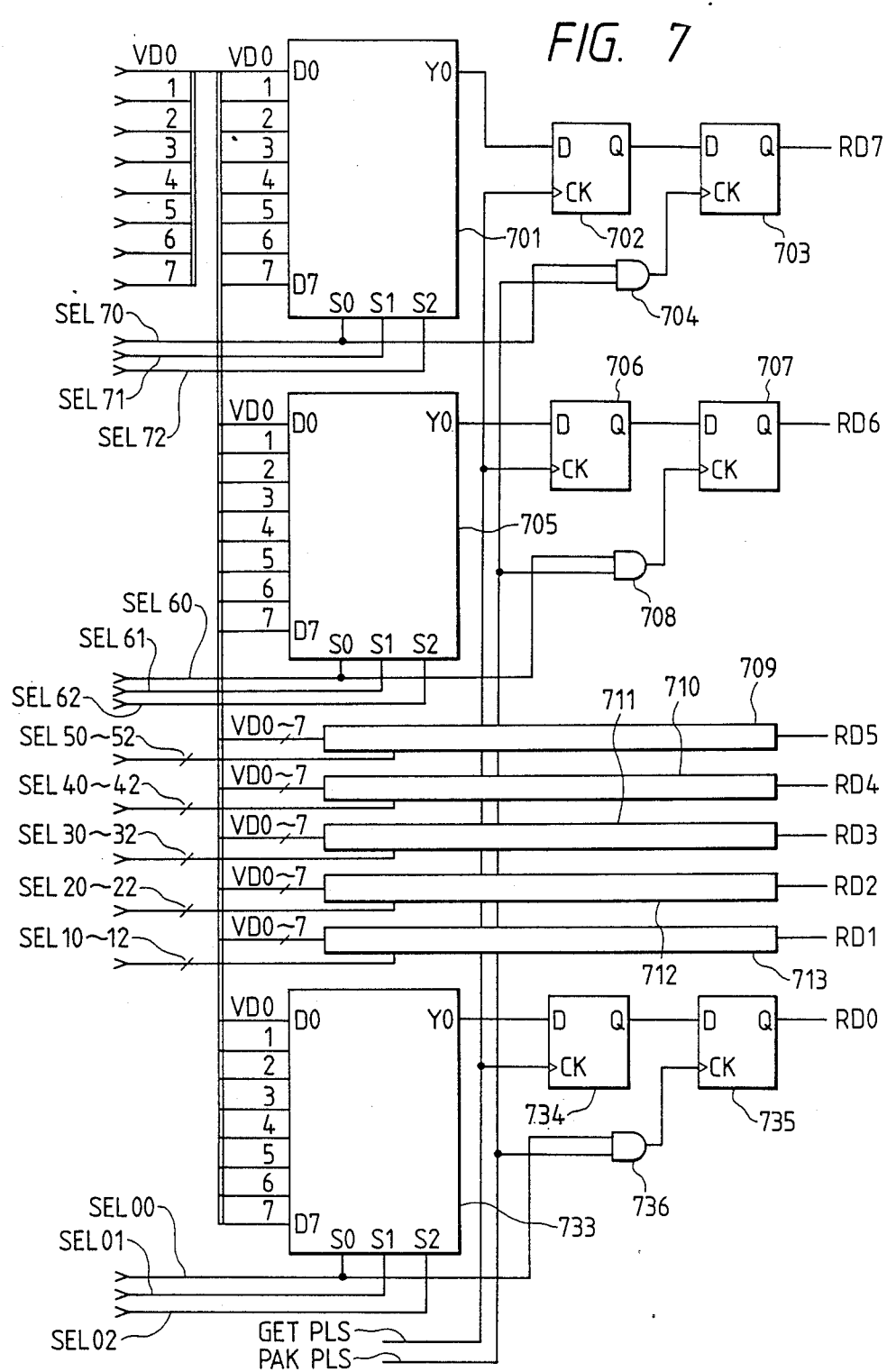
FIGS. 7 and 8 are detailed block diagrams of a packing circuit.
Figure 8:
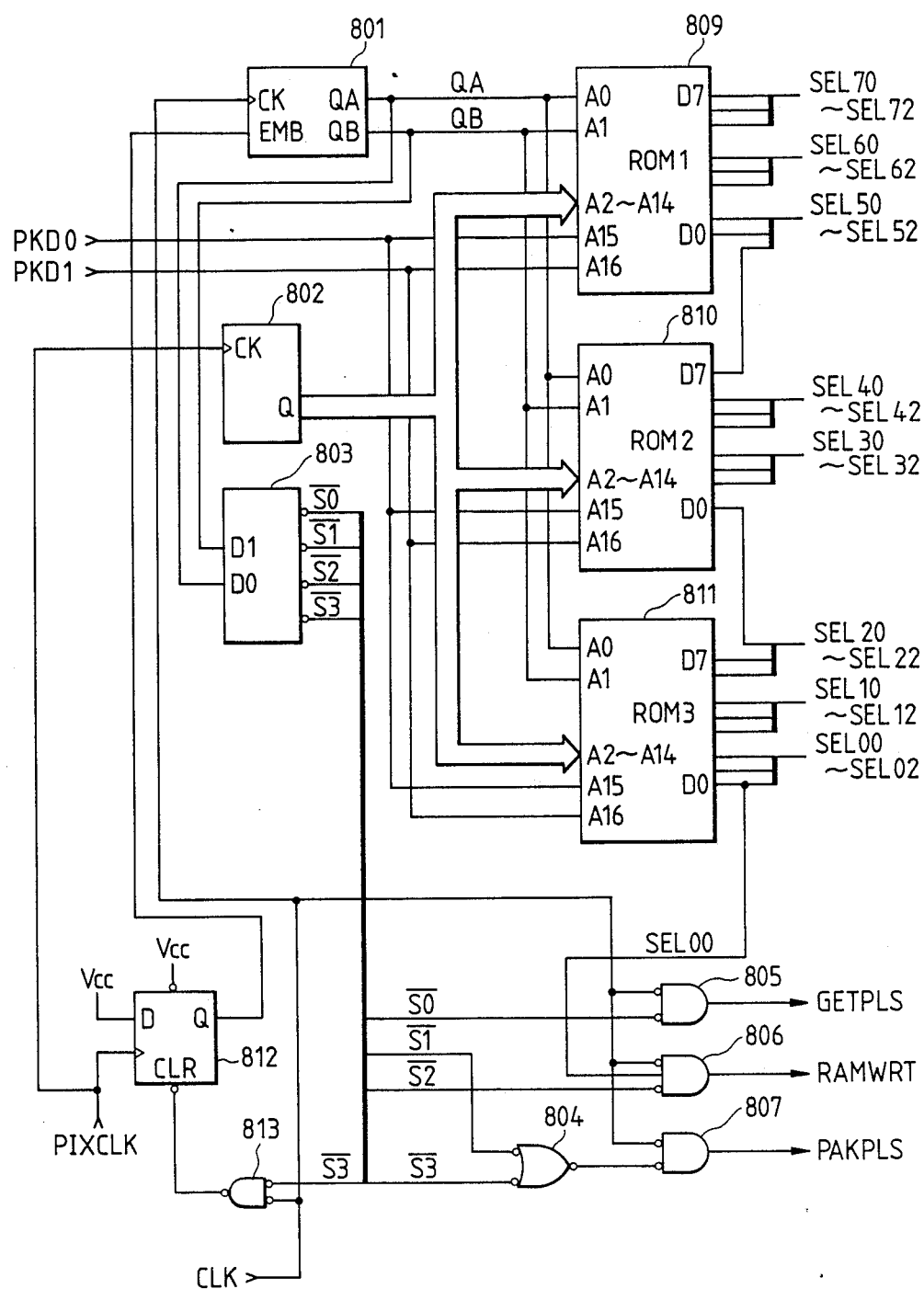

FIGS. 7 and 8 show a multi-value data packing circuit as an example of the packing circuit 205 in FIG. 2. The packing circuit in FIGS. 7 and 8 includes a selector 701 for selecting one of bits VD0 to VD7 of the 8-bit data to be set in the MSB of the transmission data after packing. This selection is performed by signals SEL70, SEL71, and SEL72. One of the eight bits which is selected by the selector 701 is latched by a D flip-flop (to be referred to as an F/F hereinafter) 702 in response to a pulse signal GETPLS. This cycle is a period for reordering the input image data. An F/F 703 performs latching in response to the next pulse signal PAKPLS to latch eight bits to be sent to the external device 250. The output of the F/F 703 is connected to the buffer memory (206 in FIG. 2). The bits are packed by the above F/Fs and written as byte data.

A selector 705 and F/Fs 706 and 707 select a bit set in a bit next to the MSB of the transmission data after packing. A selector 733 and F/Fs 734 and 735 selects a bit set in the LSB of the transmission data after packing. Circuit blocks 709 to 713 have the same arrangement as described above and are used to select corresponding bits set in other bits of the transmission data after packing. Therefore, eight sets of a selector and two F/Fs are used.

Figure 9:
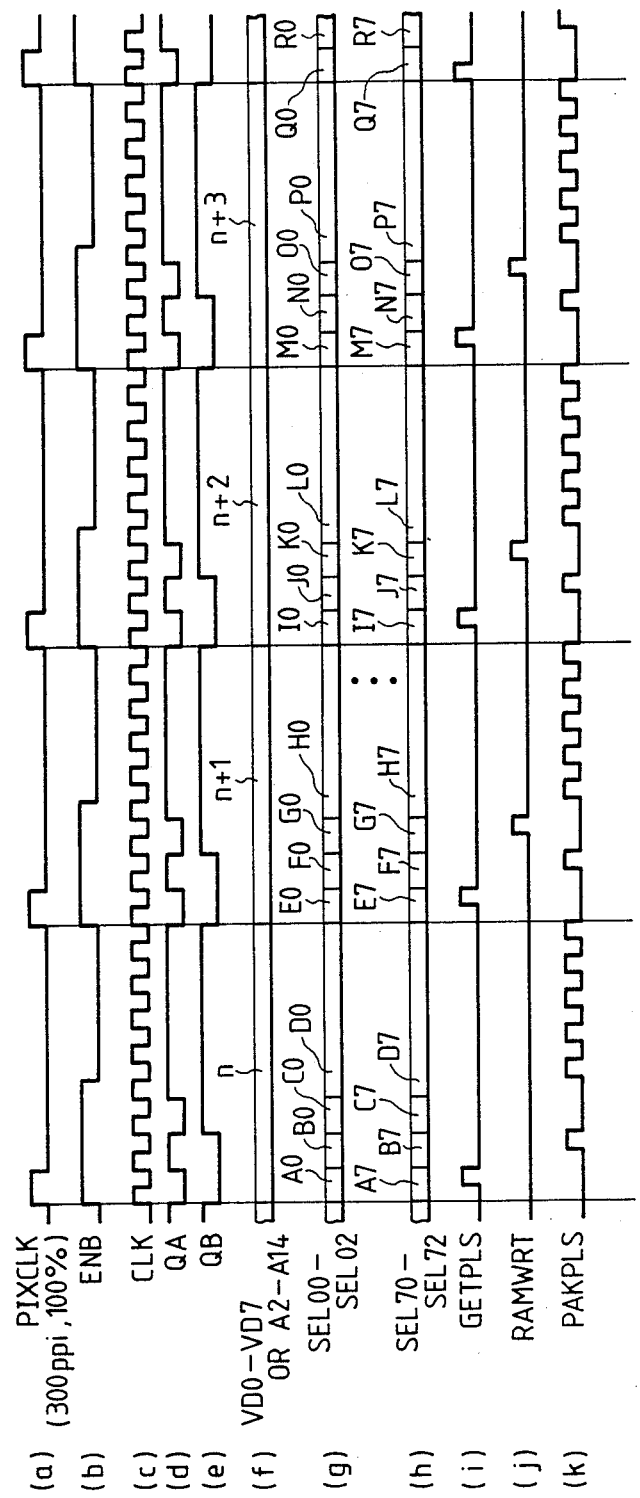
FIG. 9 is a timing chart of various signals associated with packing.

FIG. 8 is a block diagram showing a circuit for generating selection and timing signals for driving the selectors and F/Fs described above. This circuit arrangement includes counters 801 and 802 and a decoder 803. Signals shown in FIG. 9 are output from this circuit arrangement.

The counter 801 counts a basic clock CLK. The start and end of counting of the counter 801 are controlled by an F/F 812. The counter 802 counts pulses PIXCLK output from the control circuit 214 and is synchronized with image data input to the packing circuit 205.

An output from the counter 802 drives address lines A2 to A14 of a ROM1 809 to a ROM3 811. More specifically, each of the ROMs 809 to 811 is updated every four addresses per pixel. The ROMs 809 to 811 are, e.g., EPROMs, and are called format control ROMs. Each of the ROMs is updated every four addresses within a one-pixel period, i.e., one PIXCLK period. Outputs from the ROMs serve as bit selection signals SEL for the eight selectors shown in FIG. 7. Output values of the ROMs are shown in FIG. 10 when upper six bits are selected from eight image data bits VD0 to VD7 and 6-bit data is packed into 8-bit data. Each pixel period consists of four cycles. In the 0th cycle, values shown in the table of FIG. 10 are output to the selectors by using three signal lines of each ROM. In this cycle, the order of bits of the 8-bit data is changed. For example, the value of "2" (SEL00 - SEL02) corresponding to A0 of FIG. 9 represents selection of the third bit from the LSB of the 8-bit input image data. A pulse represented by X in the table, e.g., A7 in FIG. 9, is an arbitrary value, and the content of the pulse is indeterminate.

In the first cycle, only the lowest one of the three signal lines for supplying the bit selection signal SEL to each selector is used. This cycle is used to generate the PAKPLS pulse. This pulse clocks the F/F 703 after being gated through a gate 704 shown in FIG. 7. This cycle is used to pack the reordered data into 8-bit data. Therefore, in this cycle, the gate 704 is arranged to selectively clock only bits required for packing.

The second cycle is used to write the packed data into the buffer memory 206. When packing is not completed, a RAMWRT pulse is not generated in this cycle.

In the third cycle, remaining bits after packing are transferred from F/Fs corresponding to the F/F 702 to F/Fs corresponding to the F/F 703.

Reordering, latching, packing, writing of data in the buffer memory, and saving of remaining data are repeated according to the order of cycles described above. Upon repetition of the above operations, designated packing is performed. Upper two signal lines A15 and A16 of each ROM are used to designate four data widths, i.e., 4, 6, 7, and 8, of the multi-value data selected in this embodiment. The multi-value data width is designated by the CPU 208. The contents of multi-value format control for determining this data packing format are not limited to those shown in this embodiment, but can also be used to designate right or left shifting in the 6-bit format. The designation of these multi-value formats can be arbitrarily determined by changing the contents of ROMs in FIG. 8.

As described above, in this embodiment, packing is performed to cope with the 8-bit parallel data external bus. However, packing is not limited to this mode of operation. When an interface signal with an external device is serially connected, serial packing can be performed in accordance with a data width designated by the external device, as shown in FIG. 11. In this case, this packing operation can be performed by parallel-to-serial conversion inside the buffer memory 206 (FIG. 2). Furthermore, necessary bits may be sequentially sent to the memory by using only the selector 701 shown in FIG. 7. In this case, the memory comprises a FIFO memory.

The format control ROMs may be replaced with RAMs, and the RAMs may be freely accessed by the CPU 208, and at the same time the data associated with the format may be loaded from an internal ROM of the CPU 208 to the RAMs.

As described above, the image reading apparatus using the circuit of this embodiment can pack into 8-bit data the multi-value data having an arbitrary data width designated by the external device, and can transmit the packed 8-bit data. The image recording apparatus capable of freely transmitting image data is compatible with an external device such as a compact personal computer and a host minicomputer having a large memory.

As is apparent from the above description, since each ROM in FIG. 8 comprises an EPROM, the packing format can be simplified, and various multi-value data formats can be provided with minimum modifications.

As described above, since the bit width of the multi-value data of the image signal to be transmitted is set to be variable, the image signal can be transmitted with a bit width suitable for the external device.

In the above embodiment, the multi-value digital signal obtained by A/D-converting the analog image signal obtained by reading the original is directly output. An arrangement capable of converting the image signal into a multi-value digital signal and binary data and outputting the obtained data will be described according to another embodiment of the present invention.

In this embodiment, an image reading apparatus includes a 6-bit A/D converter. One pixel photoelectrically converted by the image reading apparatus is modulated into multi-value image data, binary image data, and dither image data. The multi-value, binary, and dither image data are combined and output as multi-value, binary, and dither image data having 8 bits/pixel.

This embodiment will be described in detail with reference to the accompanying drawings.

Figure 12:
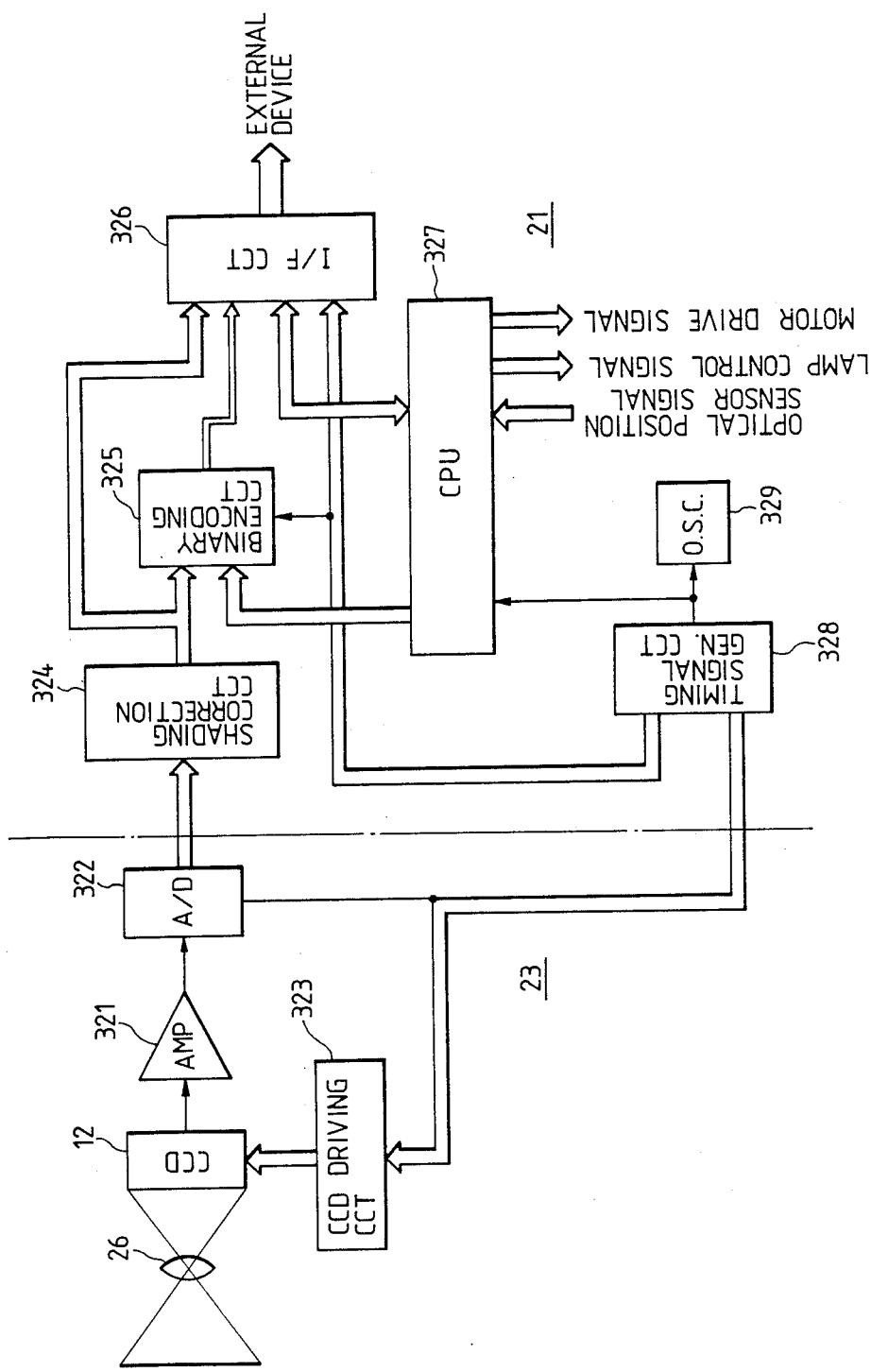
FIG. 12 is a block diagram showing another circuit arrangement of a CCD driver and a control unit.

FIG. 12 is a block diagram showing a circuit arrangement of a CCD driver 23 and a control unit 21.

An operation of the image or original reading apparatus will be described with reference to FIGS. 1 and 12.

This reading apparatus is connected to an external device (e.g., a personal computer), and communication of control signals with the external device and image information signal outputs to the external device are performed through an I/F circuit 326. Various modes are designated by the external device while an original 18 is placed on a platen glass 17. For example, these modes include a pixel density mode and an image magnification mode.

Upon reception of these mode signals from the external device, a CPU 327 sends the mode signals to a timing signal generation circuit 328 and a motor drive output unit (not shown), thereby setting the pixel density, the image magnification, and the like.

When a read start command from the external device is received by the reading apparatus, the CPU 327 detects that an illumination unit 15 is located at the read start position (home position) in accordance with an optical position sensor signal and outputs a lamp control signal. In response to the lamp control signal, a lamp 15a is turned on. After the light amount of the lamp is stabilized, the CPU 327 outputs a motor drive signal to move the optical system to the read start position (leading end of the original).

Meanwhile, the image focused on a CCD sensor 12 is converted into a digital value and input to the I/F circuit 326. Since this image is not a real image, the CPU 327 outputs a control signal to the I/F circuit 326 so as not to output the image signal.

When the optical system reaches the read start position, the CPU 327 outputs an image signal output enable control signal to the I/F circuit 326. The read image data are sequentially output to the external device. When the optical system reaches the original read end position, the CPU 327 outputs an image output disable control signal to the I/F circuit 326 and an original read end signal to the external device.

The CPU 327 outputs a lamp control signal to turn off the lamp 15a. The CPU 327 outputs a motor drive signal to return the illumination unit 15 to the home position. After the CPU 327 detects in accordance with an optical position sensor signal that the illumination unit 15 has reached the home position, the CPU 327 stops outputting the motor drive signal, and the read operation is completed.

The original is illuminated by the lamp 15a, and the optical image passing through a lens 26 and focused on a CCD sensor 12 is output to the external device. These operations will be described in detail below.

Figure 13:
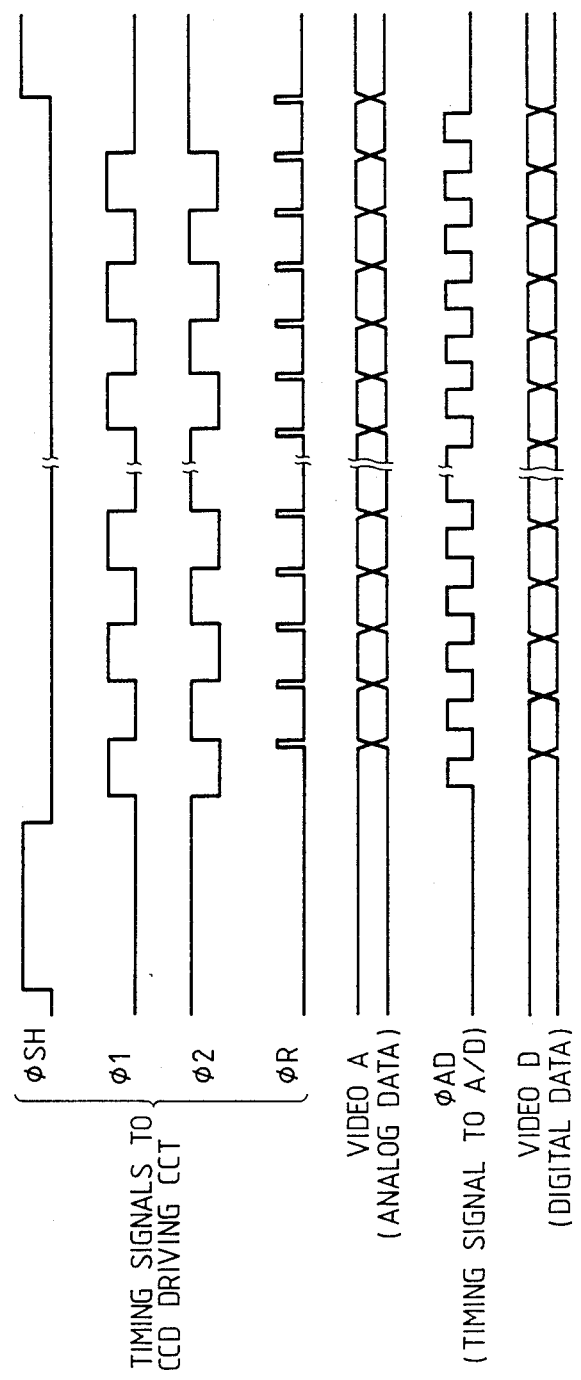
FIG. 13 is a timing chart showing operations in the arrangement of FIG. 12.

The CCD sensor 12 in the CCD driver 23 is driven by a CCD driving circuit 323 in response to a timing signal generated by a timing signal generation circuit 328 in the control unit 21. An analog image signal output from the CCD sensor 12 is amplified by an amplifier 321, and the amplified signal is input to an A/D converter 322. The A/D converter 322 converts the analog image signal into a 6-bit digital signal in response to a timing signal (FIG. 13) generated by the timing signal generation circuit 328. The 6-bit digital signal is output to the control unit 21.

In the control unit, high-frequency distortion (nonuniformity of the lamp and variations of the pixel characteristics of the CCD) of the image information is corrected by a shading correction circuit 324. The corrected data is output to the I/F circuit 326 and a binary encoding circuit 325.

Figure 14:
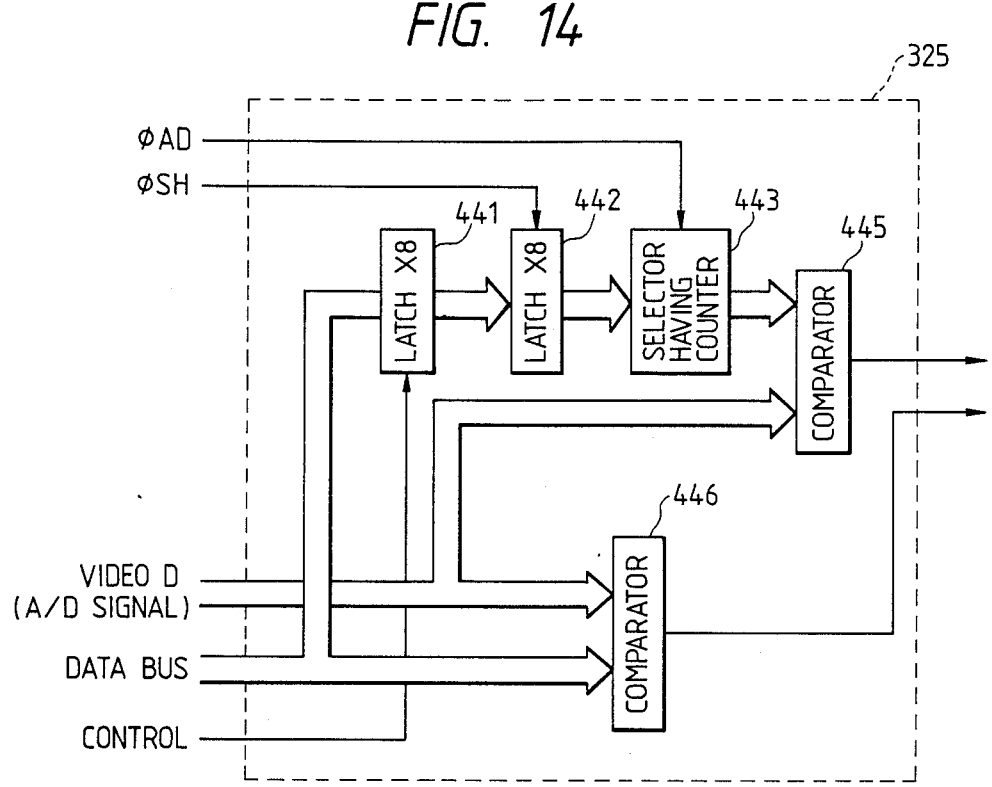
FIG. 14 is a detailed block diagram of a binary encoding circuit shown in FIG. 12.

The binary encoding circuit 325 modulates the 6-bit multi-value data into binary/dither data (FIG. 14) by using slice data for converting the multi-value data into binary data and slice data for converting the multi-value data into dither data. These slice data are predetermined by the CPU 327.

A main scanning dither matrix is written by the CPU 327 into a latch circuit 441 comprising eight 6-bit latches. The latched data is then input to a latch circuit 442 comprising eight 6-bit latches. This data is latched by a clock φSH. The dither matrix data currently written in the latch circuit 441 is input to a selector 443 having a counter in the next subscanning read cycle.

The selector 443 repeatedly counts "0" to "7" by clocks φAD (one-pixel clocks) and selects one of the eight dither data output from the latch circuit 442. The selected data is input to a comparator 445 and is used as slice data for the 6-bit multi-value data output from the A/D converter 322. Eight subscanning dither data (6 bits x 8) are latched by the latch circuit 441, thereby realizing an 8 × 8 dither matrix.

The binary/dither data output from the binary encoding circuit 325 is combined with the multi-value data (six bits/pixel) output from the shading correction circuit 324 and converted into image data (eight bits/pixel) by the I/F circuit 326.

Figure 15:
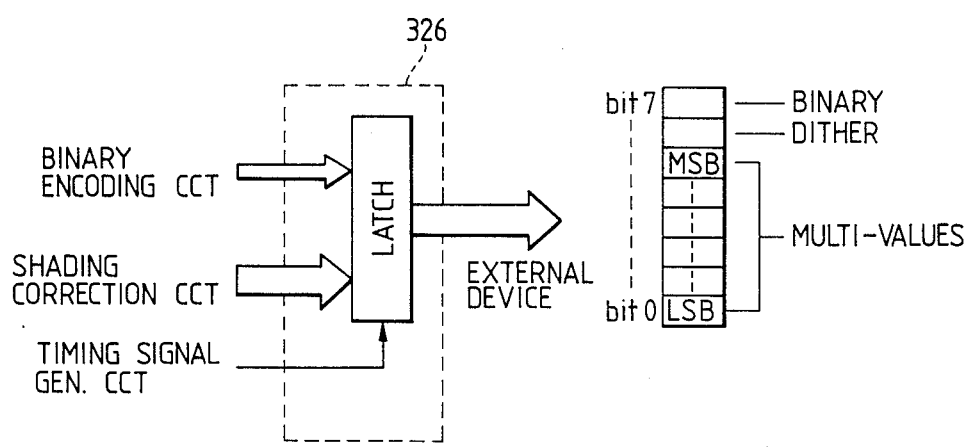
FIG. 15 is a view showing input/output states of an interface circuit shown in FIG. 12.

FIG. 15 shows an image data output unit in the I/F circuit 326. Bit 0 to bit 5 are assigned to multi-value data, bit 6 is assigned to dither data, and bit 7 is assigned to the binary data, thereby representing a combination of three image data.

As described above, the format of the image data output from the reading apparatus is set to be 8 bits/pixel, and the multi-value data, the dither data, and the binary data are simultaneously transmitted to the external device.

According to the embodiment described above, at least two transfer formats of image data transferred to the external device are available, and a minimum transfer unit is set to be one-pixel data, thereby simplifying the reading apparatus and reducing the cost.

In this embodiment, an original is fixed in position and is read by moving the illumination unit 15. However, the present invention is also applicable to a "sheet through" scanner. Originals need not be inserted into the reading apparatus every time the image is read when the image modes (multi-value, dither, and binary modes) are changed to read the image, thereby requiring only a single read operation.

In addition, when an original including both characters and a photograph is to be read, the character and photographic portions need not be designated to the reading apparatus. A read area can be set by the external device, and at the same, an irregular area can also be designated.

In the arrangement of FIG. 12, the image signal is converted into 6-bit multi-value data by using the 6-bit A/D converter 322. However, as shown in FIG. 2, after the image information is converted into 8-bit multi-value data by using the 8-bit A/D converter, the 8-bit multi-value data may be converted into 6-bit multi-value data by, e.g., the I/F circuit 326 in accordance with a request from the external device.

In this embodiment, 6-bit multi-value data is combined with the one-bit dither data and the one-bit binary data to obtain 8-bit data. However, the number of bits of the multi-value data and the number of bits of the final data are not limited to 6 and 8, respectively. In addition, the binary data may be another binary data such as binary data subjected to error diffusion.

The present invention has been described with reference to the preferred embodiments. However, the present invention is not limited to the particular embodiments described above. Various changes and modifications may be made within the spirit and scope of the appended claims.

What is claimed is:

1. An image reading apparatus comprising:
    reading means for scanning an original image and outputting an analog image signal;
    converting means for converting the analog image signal output from said reading means into multi-value data consisting of a plurality of bits in units of pixels;
    changing means for changing the number of bits of the multi-value data output from said converting means; and
    packing means for linking the multi-value data sequentially output from said changing means and packing such data into a predetermined number of bits of data.

2. An apparatus according to claim 1, wherein said changing means comprises selecting means for selecting n (N>n) bits of N-bit multi-value data output from said converting means.

3. An apparatus according to claim 2, wherein the number of bits selected by said selecting means is variable.

4. An apparatus according to claim 1, wherein the packing means outputs in parallel the packed data having the predetermined number of bits.

5. An image reading apparatus comprising:
    reading means for scanning an original image and outputting an analog image signal;
    first converting means for converting the analog image signal output from said reading means into multi-value data consisting of a plurality of bits in units of pixels;
    second converting means for converting the multi-value data generated by said converting means into binary data in units of pixels; and
    linking means for linking the multi-value data output from said first converting means and the binary data output from said second converting means in units of pixels.

6. An apparatus according to claim 5, wherein said second converting means comprises forming means for forming the binary data by comparing the multi-value data from said first converting means with threshold data.

7. An apparatus according to claim 5, wherein said second converting means converts the multi-value data from said first converting means into the binary data by different methods 8. An apparatus according to claim 5, wherein said linking means outputs in parallel the linked data having a plurality of bits.

* * * * *